March 18, 1947.       M. G. LEONARD       2,417,768
CONTROL DEVICE
Filed Aug. 19, 1944       5 Sheets-Sheet 1

WITNESSES:
Wm. B. Sellers.

INVENTOR
Merrill G. Leonard.
BY
Paul E. Friedemann
ATTORNEY

March 18, 1947.  M. G. LEONARD  2,417,768
CONTROL DEVICE
Filed Aug. 19, 1944  5 Sheets-Sheet 2

WITNESSES:
Wm. B. Sellers.

INVENTOR
Merrill G. Leonard.
BY
Paul E. Friedemann
ATTORNEY

March 18, 1947.　　M. G. LEONARD　　2,417,768
CONTROL DEVICE
Filed Aug. 19, 1944　　5 Sheets-Sheet 3

WITNESSES:

INVENTOR
Merrill G. Leonard
BY
Paul E. Friedemann
ATTORNEY

March 18, 1947.   M. G. LEONARD   2,417,768
CONTROL DEVICE
Filed Aug. 19, 1944   5 Sheets-Sheet 5

WITNESSES:
Wm. B. Sellers.

INVENTOR
Merrill G. Leonard.
BY
Paul E. Friedemann
ATTORNEY

Patented Mar. 18, 1947

2,417,768

UNITED STATES PATENT OFFICE 2,417,768

CONTROL DEVICE

Merrill G. Leonard, Sharon, Pa., assignor to Westinghouse Electric Corporation, East Pittsburgh, Pa., a corporation of Pennsylvania Application August 19, 1944, Serial No. 550,248

3 Claims. (Cl. 114—25)

My invention relates to the control for submersible craft and, more particularly, to the control of the horizontal rudders of a torpedo or other submersible craft to thus predetermine the depth of operation of the craft.

The Government of the United States has been granted a certain royalty-free license for governmental purposes with respect to the invention herein described.

The present war has introduced, as far as known to me, the first successful application of electrically propelled torpedoes and with such application electromagnetic means that are simple, cheap, and reliable have become necessary for the control of such torpedoes.

One object of my invention is the provision for controlling the depth of a submersible craft as a function of both the hydrostatic head and the angle of tilt of the longitudinal axis of the craft with reference to the horizon, or vertical.

Another object of my invention is the provision of simple and efficient means for preselecting the depth at which a submersible craft, such as a torpedo, is to operate and for automatically maintaining such depth of operation.

It is also an object of my invention to provide for operation of a submersible craft on even keel, or a preselected planing angle, at a selected depth in the liquid medium through which the craft moves.

A still further object of my invention is the provision of rugged, simple, and inexpensive means for controlling the horizontal rudders of a submersible craft as a function of both the depth of the water and the angular direction of the longitudinal axis of the craft with reference to the direction of the earth's center of gravity.

The hereinbefore recited objects are in nowise an exhausted statement of the objects of my invention but are merely illustrative. Many other objects and advantages will readily become apparent from a study of the following specification and the drawings accompanying the specification, in which.

Figure 1:
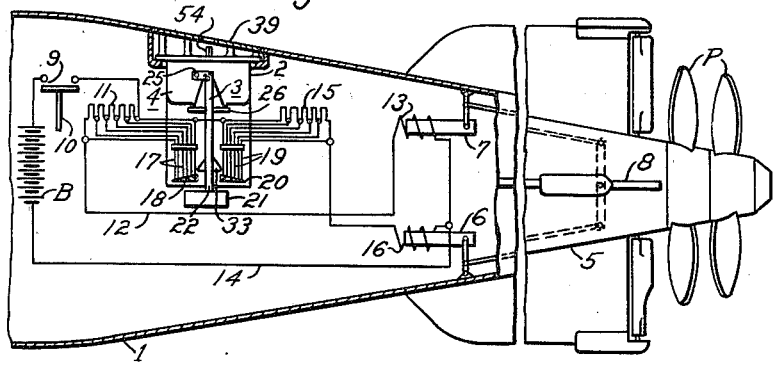
Figure 1 is a somewhat schematic showing of the afterbody and tail cone of a torpedo illustrating the fundamental features of my invention.
Figure 2:
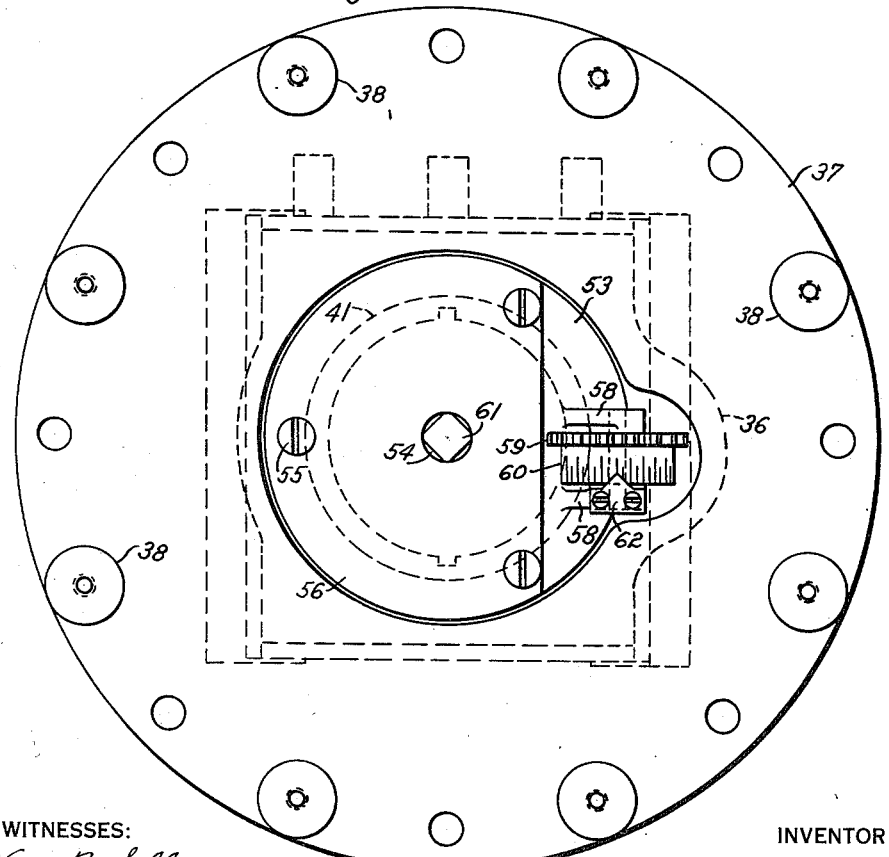
Fig. 2 is a plan view, with the cover removed, of some details of the depth and tilt control apparatus embodying my invention.

Referring to Fig. 1, the afterbody 1 is shown as housing the frame 2 for supporting the pendulum 3 and the depth responsive device 4, whereas the tail cone 5 carries the armatures 6 and 7 for controlling the horizontal rudders 8. The details of the solenoid type of control for the horizontal rudders form no part of my present invention, but reference may be had for such details to my copending application Serial No. 542,757, filed June 29, 1944 and entitled Solenoids.

The propulsion control and other features that make for a successful operation of the torpedo other than the depth control herein disclosed, have not been shown since such features form no part of my present invention. It suffices to know that the battery B, as soon as the torpedo is fired, is connected to supply energy to the propulsion motors for driving the two propellers P of the torpedo in opposite directions, respectively, to cause the appropriate motion of the torpedo through the water.

To better understand the details of my invention as shown in Figs. 2 to 6, inclusive, a brief explanation of the functioning of the schematic control shown in Fig. 1 may be helpful. When the torpedo is fired, the contacts 9 of a contactor 10 are closed, whereupon a circuit is established from the upper or positive terminal of battery B through contacts 9, some or all of the sections of resistor 11, conductor 12, solenoid 13, and conductor 14 to the other, or negative, terminal of the battery. Another circuit is established from the upper or positive terminal of the battery B through contacts 9, some or all of the sections of resistor 15, solenoid 16, and conductor 14 to the other, or negative, terminal of the battery. From these two pair of circuits described, it is apparent that both solenoids 13 and 16 are energized. From this energized condition coupled with the fact that some stabilizing effect is obtained from the rudder itself on the armatures 6 and 7, it is apparent that the rudders 8, for substantially equal energization of the solenoids, will be maintained in some predetermined plane with reference to the longitudinal axis of the torpedo. The usual and preferred rudder position is in a plane including the longitudinal axis of the torpedo.

The sections of resistor 11 are respectively connected to a plurality of leaf-springs 17 of conducting material which are arranged to contact the insulating block 18 so as to be out of contact with each other when not subjected to any controlling action from the pendulum 3 or the depth control device 4, or both. In such condition, all of the resistor sections of resistor 11 are in the circuit of solenoid 13. The sections of resistor 15 are similarly connected to leaf-springs 19 also of conducting material contacting with an insulating block 20 in such a manner as to maintain the leaf-springs 19 out of contact with each other so that as long as the pendulum 3 is in the position shown all of the resistor sections 15 are in circuit with the solenoid 16. The pendulum 3 includes the relatively heavy weight 21 mounted at the bight of a rigid U-shaped metal strap 22 that has its legs 23 and 24 pivoted at point 25 on frame 2.

The depth control device, described more in detail hereinafter, includes a U-shaped member 26 at its bight coupled to a diaphragm 27 that is actuated in response to the hydrostatic head to which the torpedo is subjected. The legs 28 and 29 are pivotally connected at 30 and 31 to the legs 23 and 24, respectively.

After the torpedo is launched, or fired, and after the propulsion motor drives the torpedo, the longitudinal axis of the torpedo is disposed at a greater than a given angle with reference to the horizon, or a vertical, the weight 21 will move out of the position shown, and the leaf-spring actuator 33 adjustably coupled to the legs 23 and 24 will make contact with either the leaf-springs 17 or the leaf-springs 19, depending upon the direction of the longitudinal axis of the torpedo with reference to a vertical, namely, depending upon whether the bow is pointing down or up. When so displaced, some or all of the leaf-springs 17 or 19, as the case may be, will be deflected so as to make contact with each other thereby shunting successive sections of one or the other; the control resistors 11 and 15 shown and the number of sections so shunted will depend upon the magnitude of the deviation of the longitudinal axis of the torpedo from a selected position with reference to the horizon. The solenoids 13 and 16 will thus be energized at different values and, in consequence, the horizontal rudders 8 will be disposed in an opposite sense with reference to the torpedo axis so as to bring it back to the desired direction of travel.

On the other hand, if direction of travel of the torpedo be correct but yet it is at a depth not selected for its operation then the depth responsive device 4, acting through the pivot points 30 and 31, also deflects the pendulum proportional to the hydrostatic head to which the torpedo is subjected and in consequence the resistor sections of resistors 11 and 15, depending upon whether or not the head is too great or too small, will be shunted. The solenoids will thus also be energized as the function of the depth of operation of the torpedo. The action of the depth responsive device and the pendulum responsive to the direction in which the torpedo is pointed with relation to the direction of the earth's center of gravity, are, through their interconnection, interdependent. Their effects may be additive or subtractive but their effects are always present. It is, therefore, apparent that the position of the horizontal rudders is made to operate as a function of both the depth and the direction of travel of the torpedo with reference to a vertical line.

Figure 3:
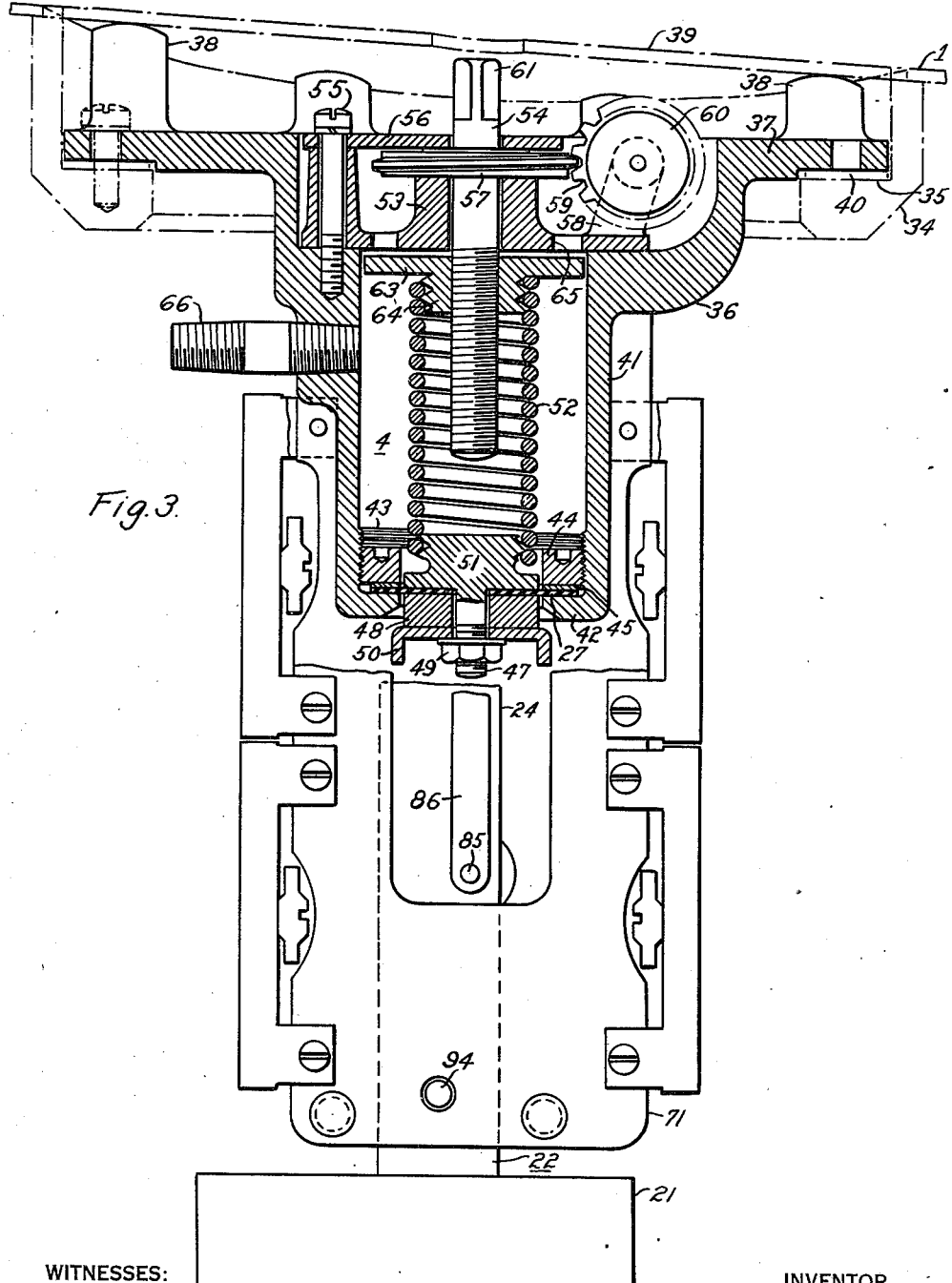
Fig. 3 is a side view of some details of my invention, the view being from the port side of a torpedo and with certain parts, for purposes of clarity, sectioned on a vertical plan parallel, or including, the longitudinal axis of the torpedo.
Figure 4:
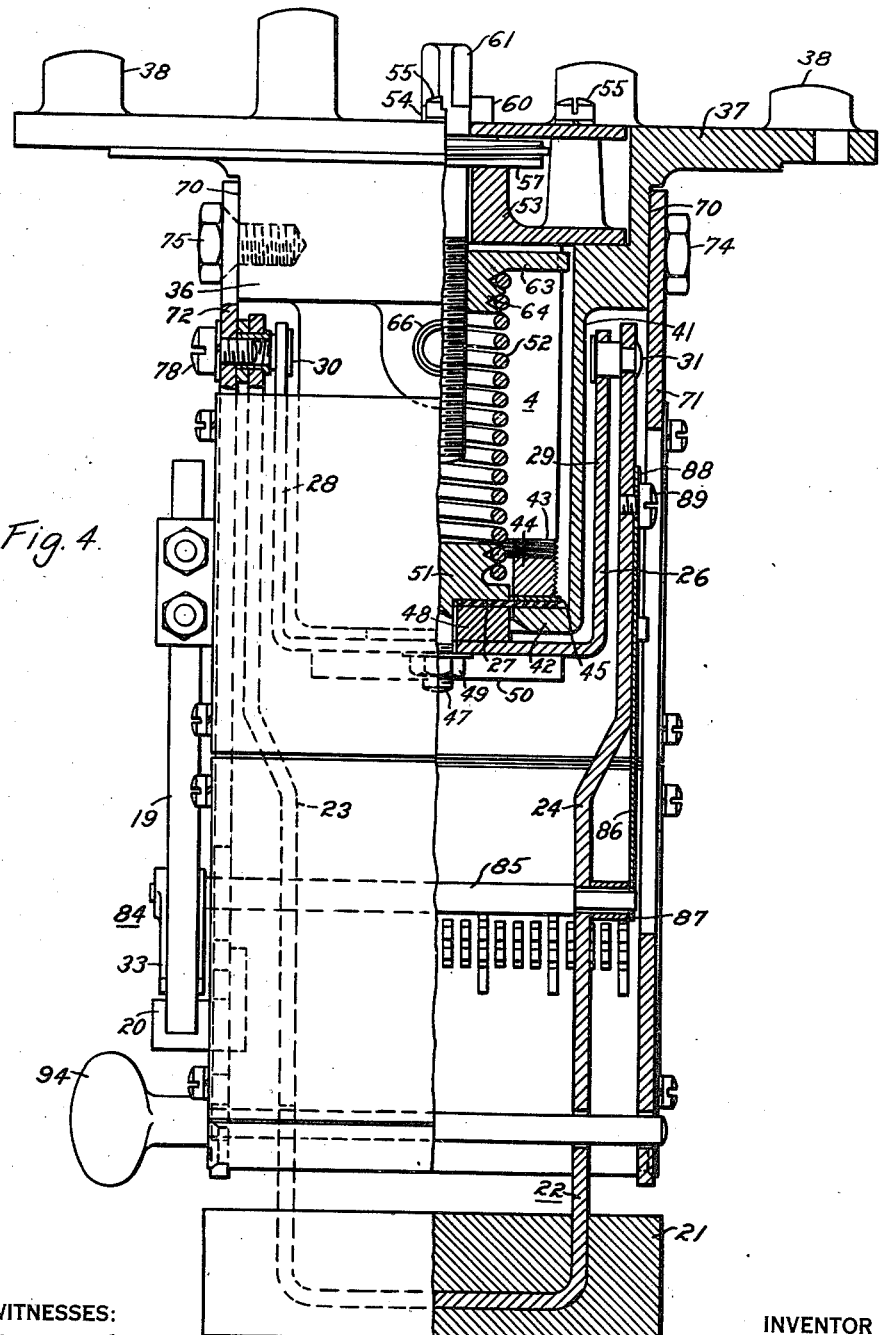
Fig. 4 is a front view, that is, a view looking from the bow towards the aft portion of the torpedo and with the right-hand portion broken away and shown in section on a vertical plan transverse of the torpedo, showing some details of my invention.
Figure 5:
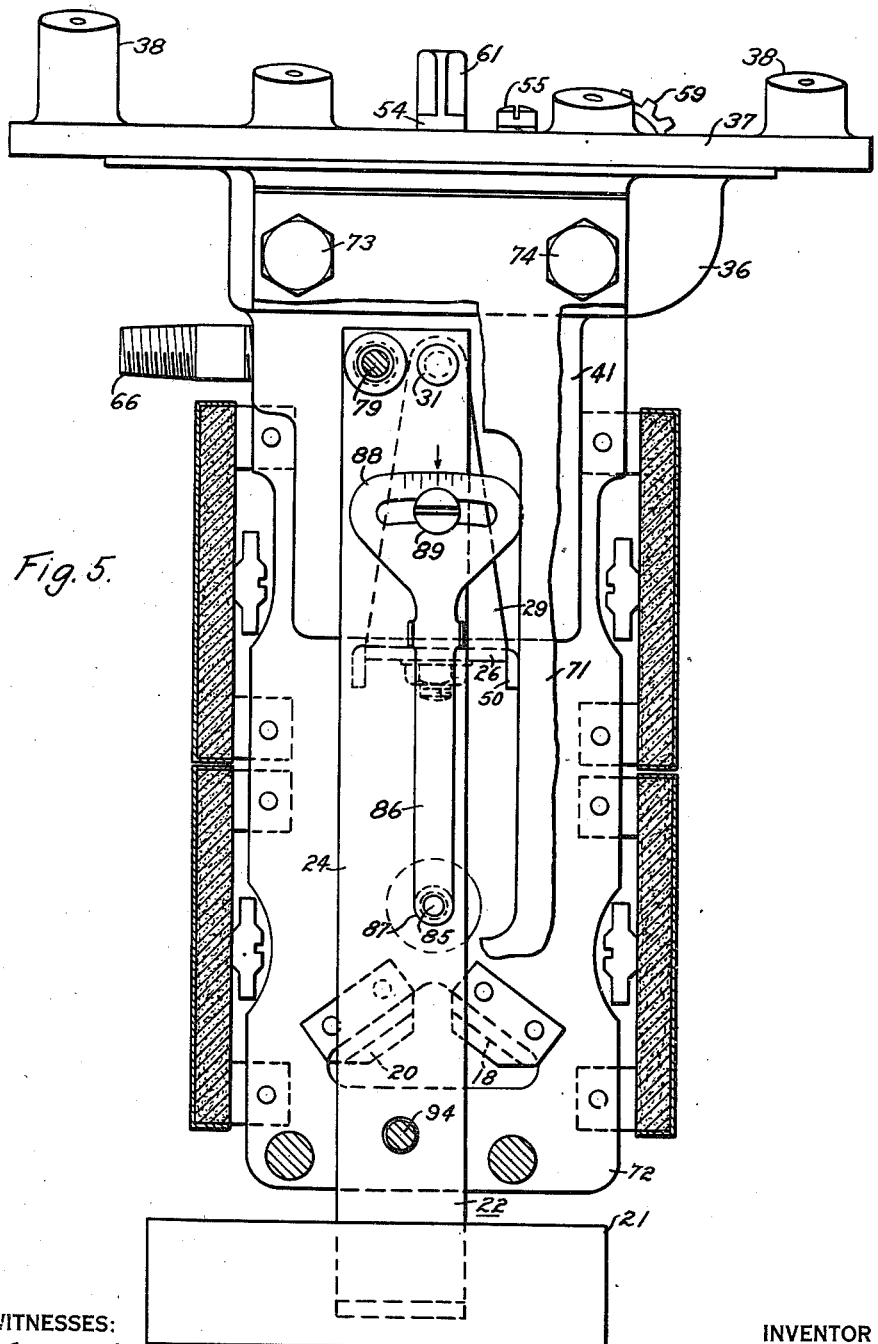
Fig. 5 is a view from the port side of the torpedo, with certain parts broken away, to show still other details.
Figure 6:
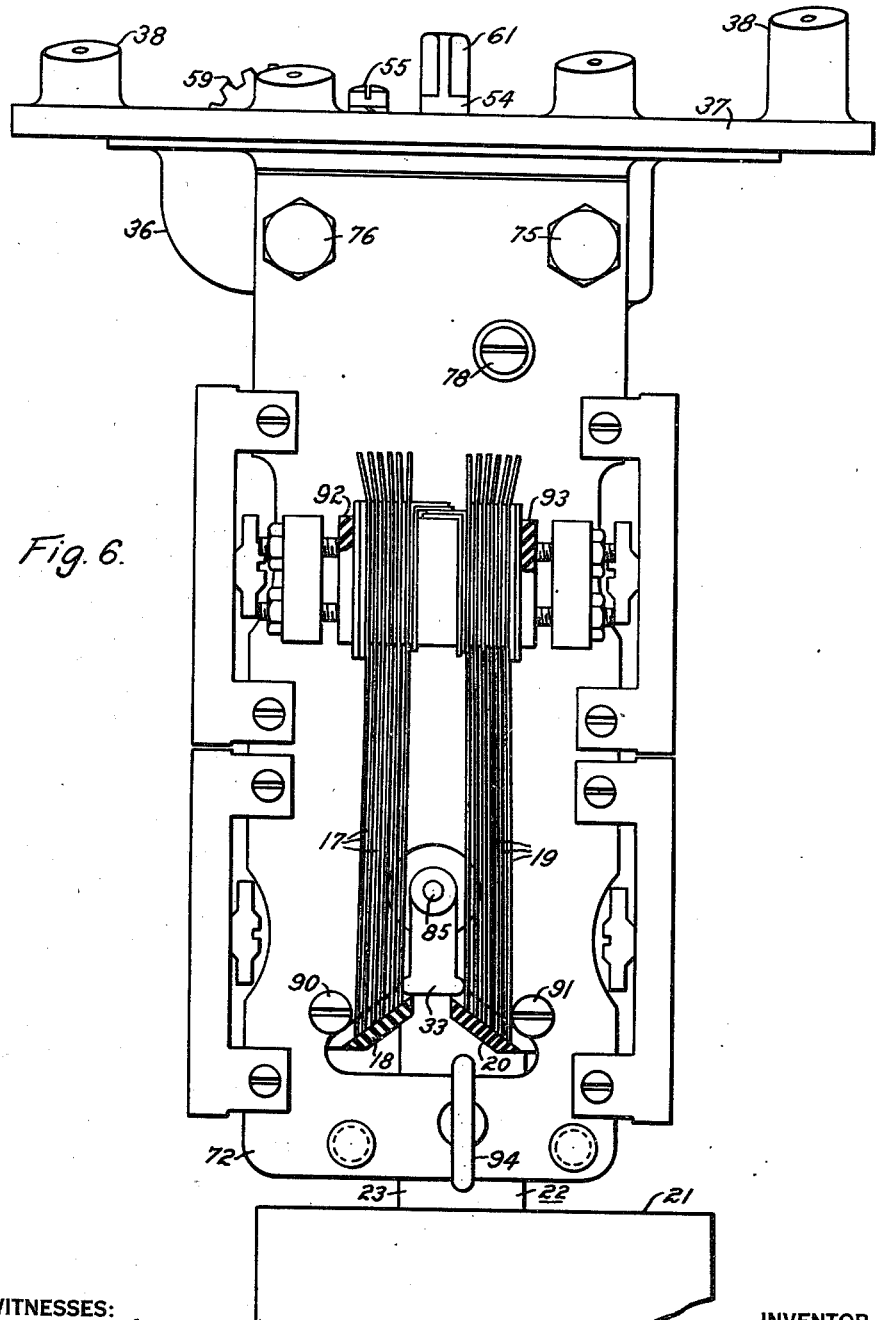
Fig. 6 is a view from the starboard side of the torpedo illustrating certain features of my invention.

The details of my present invention are best shown in Figs. 2 to 6, inclusive. Referring to Fig. 3, it will be noted that the afterbody 1 is provided with an opening to which I hermetically seal the annular member 34 having the horizontal shoulder 35. Mounted on this horizontal shoulder 35 is the well 36. This well has the flange 37 and carries the studs or projections 38 to which a suitable cover plate 39 may be secured to give a streamlined outer contour to the afterbody of the torpedo at the region where the well 36 is mounted in the afterbody.

It will be noted that the projections 38 have various lengths and end surfaces that are at different angles. This is merely for the purpose of having the outer ends of the projections conform to the contours of the afterbody so that a rigid interconnection may be made by suitable screws disposed through the cover 39 into the projections 38. Disposed between the horizontal flange 37 and the horizontal shoulders 35 of the annular member 34 I dispose suitable gasket means 40 to provide an effective seal between the annular member and the flange 37 against the entry of any liquid into the afterbody.

Substantially centrally with reference to flange 37, the well 36 is provided with a cylindrical deeper portion 41 having the inner shoulder 42. The cylindrical portion 41 is threaded at 43 for the reception of a nut 44. Between the nut 44 and the shoulder 42 I dispose a somewhat resilient pressure plate 45 and the outer ring of a rubber or neoprene washer 27. The nut 44 is driven down sufficiently so that no liquid can leak from the interior of the well 36 past the rubber or neoprene diaphragm into the afterbody of the torpedo.

Disposed through the central opening of the neoprene washer 27 is the threaded stem 47 having the head construction shown. Disposed below the neoprene washer and about the stem 47 is a pressure block 48. By means of a suitable nut 49 threaded on the stem 47, the channel member 50, the pressure block 48, the neoprene washer 27 and the stem 47 having the head 51 constructed as shown are rigidly secured to each other and also provide a seal against the entry of any liquid in the afterbody at the base of cylindrical member 41 of the well 36.

It will be noted that there is some clearance between the shoulder 42 and nut 44, on the one hand, and the pressure block 48 and the head 51. Since the rubber-like diaphragm or washer 27 is flexible, the head 51 may be moved vertically over a small range depending upon the clearance selected and the flexibility of the washer 27 and the biased adjustment of head 51 presently to be described.

It is apparent that in the absence of some specific disposition or bias of the head 51, the pressure of the water on the inside of the cylindrical member 41 will have a rather uncontrolled effect on the disposition of the channel member 50. To definitely position head 51, the upper end is provided with the coarse thread shown to which I rigidly secure the spring 52.

The upper portion of the well 36 is hollowed out as shown and within this hollowed out region I mount the bearing base 53 for the tension adjusting stem 54 for adjusting the tension of spring 52. The bearing base 53 is rigidly secured to the well 36 by a plurality of bolts 55 threaded into the well 36. Just below the heads of the bolts 55 I dispose the plate 56 for definitely fixing the disposition of the worm 57 that is rigidly secured to the stem 54. At the right-hand side of the bearing base are provided a pair of ears extending substantially vertically upward from the base of the block and disposed between the ears 58 is the worm wheel 59. This worm wheel 59 has a drum portion 60 provided with graduations for indicating depth of operation of the torpedo. One of the ears is of sufficient vertical length and made flat at the top to receive the index 62 for coacting with the graduations on the drum-like portion 60.

The upper end of stem 54 has a square portion 61 to facilitate turning of the stem and the lower end of the stem 54 is threaded into the plate 63. This plate 63 is provided with a central externally threaded extension 64 by means of which the spring 52 is rigidly connected to plate 63. When the stem 54 is turned, the worm 57 is turned, thereby rotating the worm wheel 59 and thus moving the graduations on the drum portion 60 with reference to the index 62. The extent of movement on its first analysis, is an indication of the tension placed on the spring 52, but since the spring constants and the constants of the other mechanical elements are precalculated, it will be apparent that for any given tension of spring 52 a predetermined pressure of liquid within the cylindrical member 41 will be necessary to move the parts to the exact position shown in Fig. 3, namely, to move the channel member 50 so that substantially no deformation or stretching or deflection of the rubber-like diaphragm 27 is effected. To facilitate entry of the sea water or other water into the cylindrical portion 41, the bearing base 53 is provided with a plurality of holes or openings, one of which being shown at 65, to readily admit the water into the lower portion of well 36. The nipple 66 is merely a connection to some other devices in the torpedo which may require operation in accordance with the hydrostatic head to which the torpedo is subjected during operation.

The well 36 has flat regions 70 at each side so that the vertical plates 71 and 72 may be rigidly secured to the well 36 by means of the bolts 73, 74, 75 and 76. These vertical plates extend a considerable distance below the horizontal flange of the well and provide a mounting for the resistors 11 and 15 as well as a mounting for the shunting means for the respective sections of these resistors. These various elements thus constitute the frame 2 hereinbefore mentioned.

The vertical plates 71 and 72 are provided with pivot pins 78 and 79, which really comprise the pivot points 25 of Fig. 1. The construction is such that the pins are rigidly mounted in the vertical bar 71 and 72 but have a bearing structure for pivotally receiving the upper ends of the legs 23 and 24 of the U-shaped strap 22 carrying the relatively heavy weight 21 at the bottom. The U-shaped strap is generally of a flat construction and the bearing opening in the upper end of each of the legs is disposed, as is apparent from Fig. 5, to one side, namely, in the corner of the legs 23 and 24. The weight 21, on the other hand, is so connected to the lower end or the bight of the U-shaped strap 22 that the center of gravity is substantially directly below the pivot pins 78 and 79. In other words the legs 23 and 24 of the U-shaped strap 22 will normally hang substantially vertically.

At the other corners of the upper ends of the legs 23 and 24 are provided a pair of pivoted pins 30 and 31. These are rigidly mounted in the upper end of the legs 23 and 24. The channel member 50 is provided with a pair of upwardly extending legs 28 and 29 so that this structure is also U-shaped and the upper ends of the legs 28 and 29 are loosely mounted on the bearing pins 30 and 31. Since the upper ends of the legs 23 and 24 of the strap 22 are pivoted at one corner to the plates 71 and 72 and the bearing pins 30 and 31 are secured at the other corner, it is apparent that, in effect, the two legs 23 and 24 are bell crank levers operable about the bearing pins 78 and 79. Any movement of the channel member 50, which is caused to move as a function of the hydrostatic head to which the torpedo is subjected, will cause a corresponding angular movement of the legs 23 and 24 about the bearing pins 78 and 79. It is thus apparent that the pendulum 3 comprising the strap 22 and the weight 21 mounted on the pivots 28 and 29 is also influenced in its action by the movement of the channel member 50.

To translate the operation of the movements of the weight 21 with changes of the longitudinal axis of the torpedo with reference to the vertical and with changes of the hydrostat head to which the torpedo is subjected to rudder action, I provide the legs 23 and 24 with bearing openings intermediate their ends for receiving the operating member for actuating the leaf-springs 17 and 19. This operating member 84 comprises a shaft 85 rotatably mounted in the bearing openings and provided with a leaf-spring actuator 33 of insulating material. This actuator 33 is rigidly secured as a crank arm to the shaft 85 and may be adjusted to any selected initial position by means of angular rotation of the shaft 85 with reference to the legs 23 and 24. This I accomplish by means of the strap 86 which has its lower end 87 rigidly secured to the shaft 85 and is provided, as more clearly shown in Fig. 5, with a leaf-like upper end 88 having a slot for the reception of the bolt 89. By merely releasing the bolt 89 and manually shifting the upper or leaf-like end 88 of the strap 86, the angular position of the actuator 33 may be adjusted and such angular adjustment is indicated by means of the graduations on the upper leaf-like end of the strap coacting with an index on the contiguous leg of the U-shaped strap 22. This initial adjustment may become very essential. Where a predetermined angular position is to be given to the pendulous member, which may often be required, without having any controlling action affected by operation of the leaf-springs 17 and 19 except when the pendulum member departs from a predetermined angular position with reference to the vertical. To effect some further adjustments, the insulating blocks 18 and 20 are mounted on screws 90 and 91 in such manner that, before these screws are tightened, the blocks which have rather loosely fitting holes therein through which the screws 90 and 91 fit, may be shifted somewhat.

The upper ends of the leaf-springs 17 and 19 are rigidly secured to the insulating blocks 92 and 93 and in actual use the upper terminals of the leaf-springs are connected to various sections of the resistors 11 and 15. The connecting leads are not shown herein, except schematically in Fig. 1, to more clearly illustrate the mechanical construction of my contribution to the art.

To provide for a compact construction, the resistor sections are mounted on the side bars 71 and 72 as shown, so that the well 36 and the structural elements connected thereto may be inserted as a unit in the afterbody of the torpedo and removed as a unit.

Since the weight 21 is rather heavy and torpedoes have to be transported on moving crafts, it is apparent that if, after the elements of my device have been adjusted, no provision is made for maintaining a rigid connection during transportation between the weight 21 and the bars 71 and 72, the adjustments may be impaired or parts even damaged from repeated swinging of the pendulous weight 21. To prevent such relative movement of the pendulum with reference to the well 36, I provide the transportation pin 94. This pin fits through suitable openings in the bars 71 and 72 and the legs 23 and 24 of the strap 22. The transportation pin is provided with threads below its head so that it may be threaded into bar 72. It will thus not readily be dislodged and a firm interconnection is maintained between the weight 21 and the bars 71 and 72.

While I have shown but one embodiment of my invention in considerable detail, it is apparent that others, particularly after having had the benefit of the teachings of my invention, may devise other somewhat similar constructions for accomplishing like or substantially like functions, and I, therefore, do not wish to be limited to the particular showing made but wish to be limited only by the scope of the claims hereto appended.

I claim as my invention:

1. In a system of control for the horizontal rudders of a submersible craft moving through water, in combination, a pair of horizontal rudders; a pair of solenoids; armatures for each of said solenoids coupled to the rudders for moving the rudders up or down, depending on whether the submersible craft is to rise to a lesser depth or dive to a greater depth than the depth at which the craft is operating, a source of electric energy; a resistor, comprising a plurality of sections connected in series with one solenoid, connected to the source of electric energy; a second resistor, comprising a plurality of sections connected in series with the other solenoid, also connected to the source of electric energy; and means responsive to the angular disposition of the longitudinal axis of the craft with reference to a vertical for shunting sections of said resistors to thus so alter the energization of said solenoids that the rudders are actuated to change the vertical course of the craft so that it operates at a given angle to the vertical.

2. In a system of control for the horizontal rudders of a submersible craft moving through water at a relatively high speed, in combination, a source of electric energy; a pair of horizontal rudders for controlling the depth of operation of the craft; an armature mechanically coupled to the rudders for causing the rudders to be deflected upwardly to cause surfacing of the craft; a second armature also mechanically coupled to the rudders for causing the rudders to be deflected downwardly to cause diving of the craft; a resistor, comprising a plurality of sections; a solenoid for actuating one armature, connected to the source of energy in series with one resistor; a second solenoid for actuating the other armature, connected to the source of energy in series with the other resistor, the normal energization of each of said solenoids, when the craft is traveling at a preselected desired depth, being such that the rudders hold a selected position with reference to the craft; and control means, responsive to the depth of the craft and its angular position with reference to a vertical, for selectively shunting sections of either of said resistors to cause deflection of the rudders to control the depth and vertical direction of operation of the craft.

3. In a system of control for the horizontal rudders of a submersible craft moving through water at a relatively high speed, in combination, a source of electric energy; a pair of horizontal rudders for controlling the depth of operation of the craft; an armature mechanically coupled to the rudders for causing the rudders to be deflected upwardly to cause surfacing of the craft; a second armature also mechanically coupled to the rudders for causing the rudders to be deflected downwardly to cause diving of the craft; a resistor, comprising a plurality of sections, a solenoid for actuating one armature, connected to the source of energy in series with one resistor, a second solenoid for actuating the other armature, connected to the source of energy in series with the other resistor the normal energization of each of said solenoids, when the craft is traveling at a preselected desired depth, being such that the rudders hold a selected position with reference to the craft; control means for controlling the relative energization of said solenoids, said control means including a pendulum connected to a rigid arm pivoted to swing about a pivot axis transverse of the craft; a crankarm on the rigid arm, a member responsive to the depth of the craft for applying a force on the crankarm to thus influence the position of the pendulum, and means on the rigid arm for shunting sections of either of said resistors depending on the direction of the rigid arm with reference to the longitudinal axis of the craft.

MERRILL G. LEONARD.